United States Patent [19]

Brinkmann et al.

[11] B 4,013,745
[45] Mar. 22, 1977

[54] PROCESS FOR THE EXTRUSION OF A PLASTIC FOIL HAVING SMALL VARIATIONS IN THICKNESS

[75] Inventors: Hans Brinkmann; Gottfried Eisele; Helmut Gormar, all of Troisdorf; Horst Pabst, Bonn-Beuel; Helmut Putz, Troisdorf; Hans Jurgen Schrick, Troisdorf; Uwe Sommermeyer, Troisdorf, all of Germany

[73] Assignee: Dynamit Nobel Aktiengesellschaft, Germany

[22] Filed: May 20, 1975

[21] Appl. No.: 579,153

[44] Published under the second Trial Voluntary Protest Program on March 30, 1976 as document No. B 579,153.

[30] Foreign Application Priority Data

June 1, 1974 Germany .......................... 2426714

[52] U.S. Cl. ................................ 264/37; 264/40.4; 264/146; 264/176 R; 264/177 R

[51] Int. Cl.² ................... B29C 17/08; B29C 29/00; B29D 7/02; B29F 3/00

[58] Field of Search ............ 264/37, 40, 75, 176 R, 264/177 R; 425/145, 146, 148, 216, 217, 376, 376 A, 376 B; 222/318, 424; 359/9, 10, 154, 191

[56] References Cited

UNITED STATES PATENTS

| | | | |
|---|---|---|---|
| 3,150,213 | 9/1964 | Doering | 264/40 |
| 3,391,232 | 7/1968 | Jackson | 264/40 |
| 3,822,867 | 7/1974 | Evans | 259/191 |

*Primary Examiner*—Willard E. Hoag
*Attorney, Agent, or Firm*—Craig & Antonelli

[57] ABSTRACT

A process for extruding a film having small variations in thickness by regulating the quantities fed to a worm press and by regulating the extrusion process. Marginal strips and waste products of extruded film are re-processed by returning these materials, slicing them and directly weighing them before being fed to the filling bin of the screw press. In order to regulate the quantities fed to the screw press, the weighed material per unit of time is continually subtracted from a nominal value set by a volume regulator associated with the raw material seeder devices. The filling degree of the screw press is measured as the mass pressure between the screw press and a constant volume pump such that the filling degree is maintained constant during the extrusion process.

14 Claims, 2 Drawing Figures

PROCESS FOR THE EXTRUSION OF A PLASTIC FOIL HAVING SMALL VARIATIONS IN THICKNESS

BACKGROUND OF THE PRESENT INVENTION

The present invention relates to a process for extruding a plastic foil with small variations in thickness and, more particularly, foils requiring a highly constant thickness such as, for example, foil or films of laminated glass.

Laminated glass film made from Polyvinylbutyral and plasticizer is usually produced in such a way that the raw material is melted in a worm or spiral press, and the melted mass is then introduced under pressure from the press into a tool having a broad slot. This broad slot tool thereafter carries out the deformation of the melted mass into the desired breadth, so that at the end of the production sequence the melted mass leaves the slot tool in a broad path or course and is subsequently cooled off by means of after-connected units.

Even with temporary or transient constant dosages of the raw material—whereby polyvinylbutyral and the plasticizer in a permanent proportion, separate or mixed but preferably mixed, are introduced by means of appropriate dosage devices—the variations in thickness of the film produced thereby are still relatively large and are approximately 0.06 to 0.08 mm. These variations, however, are too large to produce an optically faultless laminated glass which utilizes the film. It is desirable to keep the variations in thickness within much more narrow limits.

With regard to the conventional method of producing such film, marginal strips occurring during the cutting of the film by means of subsequent devices or, for that matter, waste products can be introduced into the worm press, whereby the marginal strips and waste products are chopped directly in front of the inlet into the filling funnel or bin and added as shreds or slices.

In the past these marginal strips and waste products have been added unmeasured so that minor variations in quantity per unit of time cannot be avoided and thus the danger of variations in thickness of the extruded film is especially high.

The variations in thickness of the extruded film can be kept small, if between the worm press and the tool a melting pump is connected—the efficiency and field of operation of which are known—having a constant output per unit of time at a constant speed of rotation. Due to the constant output of the melting pump, however, a worm press equipped with a principally constant dosage would, in the course of time, change its filling degree, which is the proportion of the space used by the melting mass towards the entire space being available within the worm press, because the output of the melting pump and the output of the measuring devices (dosage devices) of the raw material cannot practically be tuned in or coordinated to each other in the long run. In one extreme case, the worm press would be overfed while, in the other extreme case, it would empty to an extent where it would be underfed. In neither cases could a film of constant thickness be extruded, especially since adding the marginal strips and waste products would change the quantity so quickly that the extrusion process under constant conditions would not be possible at all.

SUMMARY OF THE PRESENT INVENTION

It is one object of the invention to solve the existing problems in order to extrude films having low variations in thickness, i.e., having a high thickness constancy possible.

The foregoing problems, have been solved in accordance with the present invention by regulating the quantities fed to the worm press and by regulating the extrusion process, so as to simultaneously process the marginal strips and waste products.

The procedure according to the present invention is characterized in that the material returned is weighed directly after having been crushed and, for a regulated feeding of the worm press, the weighed material per unit of time is constantly substracted from the nominal value of a volume regulator associated with one of the raw material dosage devices. The filling degree of the worm press measured as the mass pressure between the worm press and the melting pump is additionally maintained substantially constant.

According to another embodiment of the present invention the mass pressure and therefore the filling degree of the worm press are maintained substantially constant by measuring the mass pressure between the worm press and the melting pump by means of a suitable mass pressure sensing element, by changing from this value the total nominal value of the raw material dosage by means of a filling degree regulator in a small area, for example ± 10 percent and maintaining it constant via the closed control system.

In another embodiment of the process according to the present invention the mass pressure and therefore the filling degree are maintained substantially constant by the fact that principally the total mass of raw material, marginal strips and waste products fed into the worm press is somewhat higher than the discharge of the melting pump and that the differential mass leaves the worm press through an outlet between the press and the melting pump. According to still another feature of this embodiment the mass pressure within the worm press is measured in the vicinity of the outlet by means of a mass pressure sensing element, and the outlet itself is provided with a regulating valve, so that the measured pressure is maintained constant via a control system using the regulating valve as a regulating unit.

Dosing means for solid matter and returning-material, conveyor-type weighers are preferably used, whereas for plasticizers dosing pumps are used. With the conveyor-type weigher used as a dosing device a change of mass being carried out by the mass regulator takes place through the conveying speed of the weigher and becomes effective immediately, whereas between the measuring of the returning material for marginal strips and waste products also measured on a conveyor-type weigher and the release of this mass there is a certain transportation time.

Therefore in order to have an exact synchronization of the release of the material by both weighers and idle-time member is provided in the measuring value of the weigher of the returning material that delivers the measuring value to the mass regulator delayed by the transportation time without affecting the measuring value.

Between the time when the quantity of the material is introduced into the funnel or bin of the worm press and the time when the mass pressure resulting from this quantity of material is measured, there is a certain time that the worm press needs for transporting the material. Therefore the filling degree regulator works in such a way that after a small change of the nominal value at the regulator it waits for this transportation time in order to determine the effect of the change and only then undertakes a new change, if necessary.

The process according to the present invention has the advantage that while the marginal strips and the waste products are simultaneously reintroduced, also a film having a high thickness constancy is also extruded. Marginal strips occurring during the production process can be introduced back immediately, such that it is unimportant that this reintroduction takes place timewise constantly. The weigher for the returning material determines in each instance the quantity of the occurring shreds or slices and substracts it at the right time from the total quantity of the raw material. In doing so it is essential that the shreds constantly be produced in the slicer do not have to be stored, but instead are falling directly onto the weigher for the returning material and are then introduced into the worm press, because the storage of the shreds without additional precautions such as, for instance, strong cooling would result in sticking together of the shreds. Also additional strips of material gathered from the waste rollers can be shredded and reintroduced in the same manner.

The filling degree regulator maintains the pressure, and with it the filling degree, of the worm press, constant. This means at the same time that the material in the press is exposed over a long period of time to a timewise constant "shear" energy and leaves the worm press with a timewise constant temperature. The flow conditions in the broad slot tool therefore are not subject to time variations in time which has an advantageous effect on the timewise constancy of the adjusted transverse thickness distribution. Due to the constant temperature obtained in this way and to the constant pressure of the material obtained in this way the transverse thickness distribution is practically unchanging over a long time so that it can be adjusted very exactly.

BRIEF DESCRIPTION OF THE DRAWINGS

These and further features, objects and advantages of the present invention will become more apparent from the following description which, when taken in conjunction with the accompanying drawing, which shows, for purposes of illustration only, several embodiments of the present invention and wherein.

DETAILED DESCRIPTION OF SEVERAL PREFERRRED EMBODIMENTS

Figure 1:
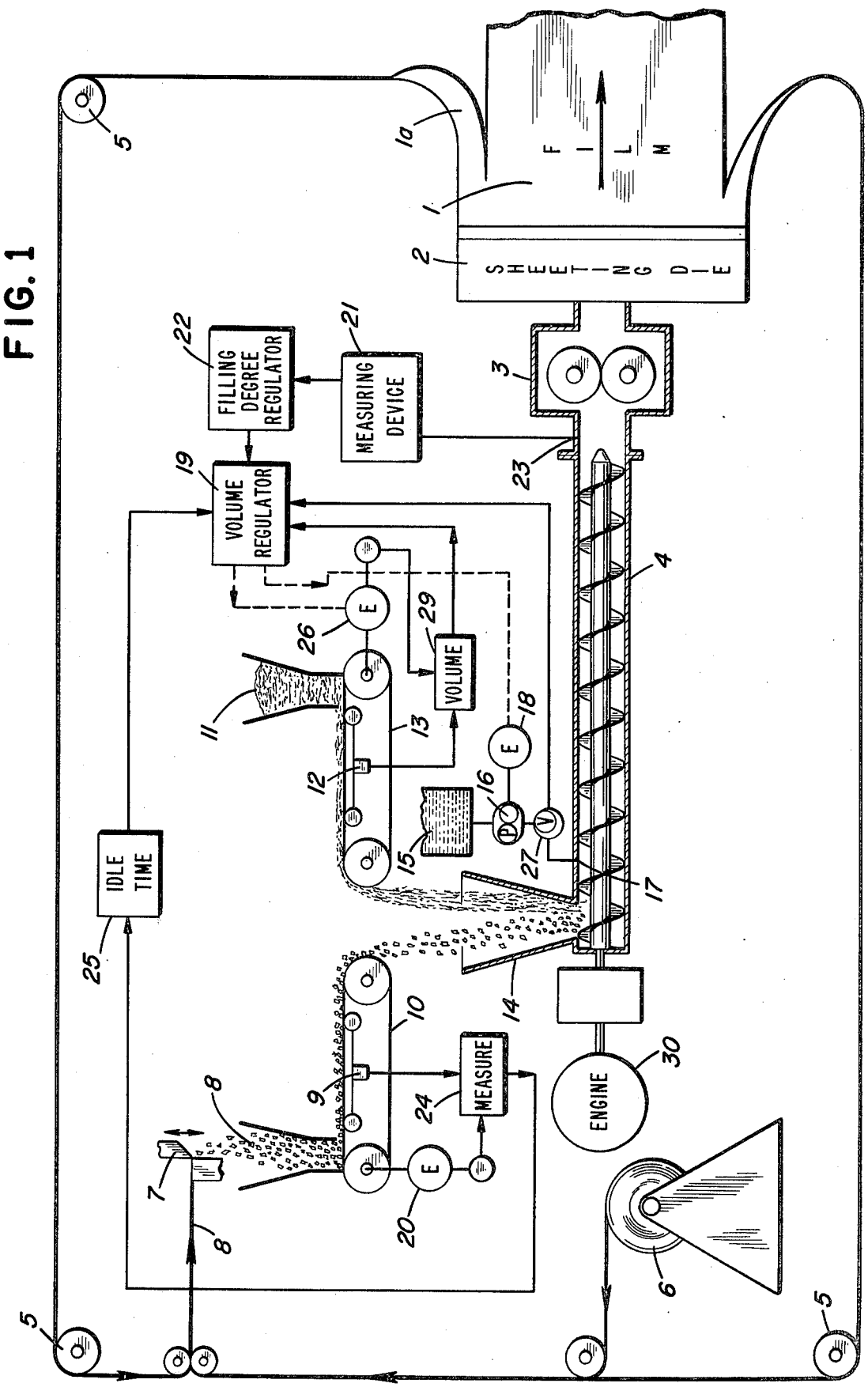
FIG. 1 is a flow diagram for the extrusion of laminated glass films.

The process according to the invention for the production of films of polyvinylbutyral is illustrated in the flow diagram of FIG. 1. The extrusion of the film 1 usually takes place in such a way that the raw or virgin material is introduced into the screw press 4 through the feeding funnel or bin 14. The screw press operated by conventional motor means 30. The raw material is melted in the screw press and the melt is fed under pressure through the melting pump 3 into the sheeting die 2 which then carries out the deformation of the melt into the appropriate breadth, so that the melt finally leaves the sheeting die 2 in a path of wide film 1. After-connected cutting instruments carry out the trimming of the edges, whereby the marginal strips 1a are removed from the film 1 on both sides and are, via guide rollers 5, delivered for introduction into the press 4. It is, however, also possible to gather,these marginal strips on so-called waste rollers 6 from which they are later delivered for introduction into the press, if necessary.

The dosage of the raw material which comprises polyvinylbutyral and plasticizer for the production of polyvinylbutyral films, is timewise constant. In the illustrated example, polyvinylbutyral and the plasticizer are added in a fixed proportion but separately. The polyvinylbutyral powder 11 is supplied via the conveyor-type weigher 12, also called the solid matter weigher. The plasticizer 15 is supplied via a dosing pump 16 being operated by a conventional motor 18 into the worm press through the inlet opening 17. The returning material 8 which comprises the material from the marginal strips 1a and the waste products from the waste rollers 6 is fed into the slicer 7 which slices it constantly into shreds 8. After having been sliced, the shreds 8 are directly and constantly measured by means of a conveyor-type weigher 9 (also called the returning material weigher) from where they are fed by means of a rotating conveyor belt 10 into the filling funnel or bin 14 of the screw press 4. The returning material weigher 9 is driven by a conventional motor 20. Also the solid matter weigher 12 operates with rotating conveyor belt 13 and is also driven by a conventional motor 26.

The extrusion process for the production of films is provided with a closed control system, whereby the material supplied into the worm press is determined as to the quantities delivered per unit of time and compared to each other and simultaneously the filling degree of the screw press is measured and added to the control system as a measured variable and as a standard value. The volume control 19 is adjusted to a nominal value for the raw material dosing devices or feeders, i.e., the solid matter weigher 12 and the dosing pump 16. This nominal value corresponds to a sufficient supply to the worm press 4 without the supply of the raw material. The quantity of the raw material per unit of time being automatically and constantly measured by means of the returning material weigher 9 is supplied as a measuring signal to the volume regulator 19 by means of a measuring means 24 and an idle-time means 25 and is then substracted from the nominal value of the volume regulator.

According to the variations in the supply of the returning material 8, the volume regulator 19 takes care of a corresponding plus or minus in raw materials 11 and 15 by corresponding control of the motor 26 for the conveyor-type weigher 12 and the motor 18 for the dosing pump 16. The constantly measured values of the solid matter weigher 12 and of the dosing pump 16 are constantly supplied via the volume measuring devices 27 and 29 to the volume regulator 19 for the nominal actual comparison. The filling degree of the worm press is maintained constant by measuring the mass pressure between the worm press 4 and the melting pump 3 with a suitable mass-pressure sensing element 23. A measuring value signal goes to the filling degree regulator 22 via the mass pressure measuring device 21. From this measuring value, the total nominal value of the raw material dosage of the volume regulator 19 is changed via the filling degree regulator 22 in a small range, for instance in the range of ±10 percent. Thereby the filling degree is finally maintained constant through the closed control system.

With the conveyor-type weighers 9, 12 used as dosing devices or feeders there is a change of volume carried out by the volume regulator 19 via the speed of conveyor 13 of the conveyor-type weigher 12 and, therby, is effective immediately. However, since there is a certain transport time between measuring the returning material quantity 8 on the returning material weigher 9 and the discharge of this quantity into the filling funnel 14 of the worm press, to achieve the exact synchronization of the discharge of material of both conveyor-type weighers 9, 12, and idle-time member 25 is connected in the measuring value of the returning material weigher, so that the measuring value of the returning material weigher 9 is reintroduced into the volume regulator 19 delayed by the transport time.

Figure 2:
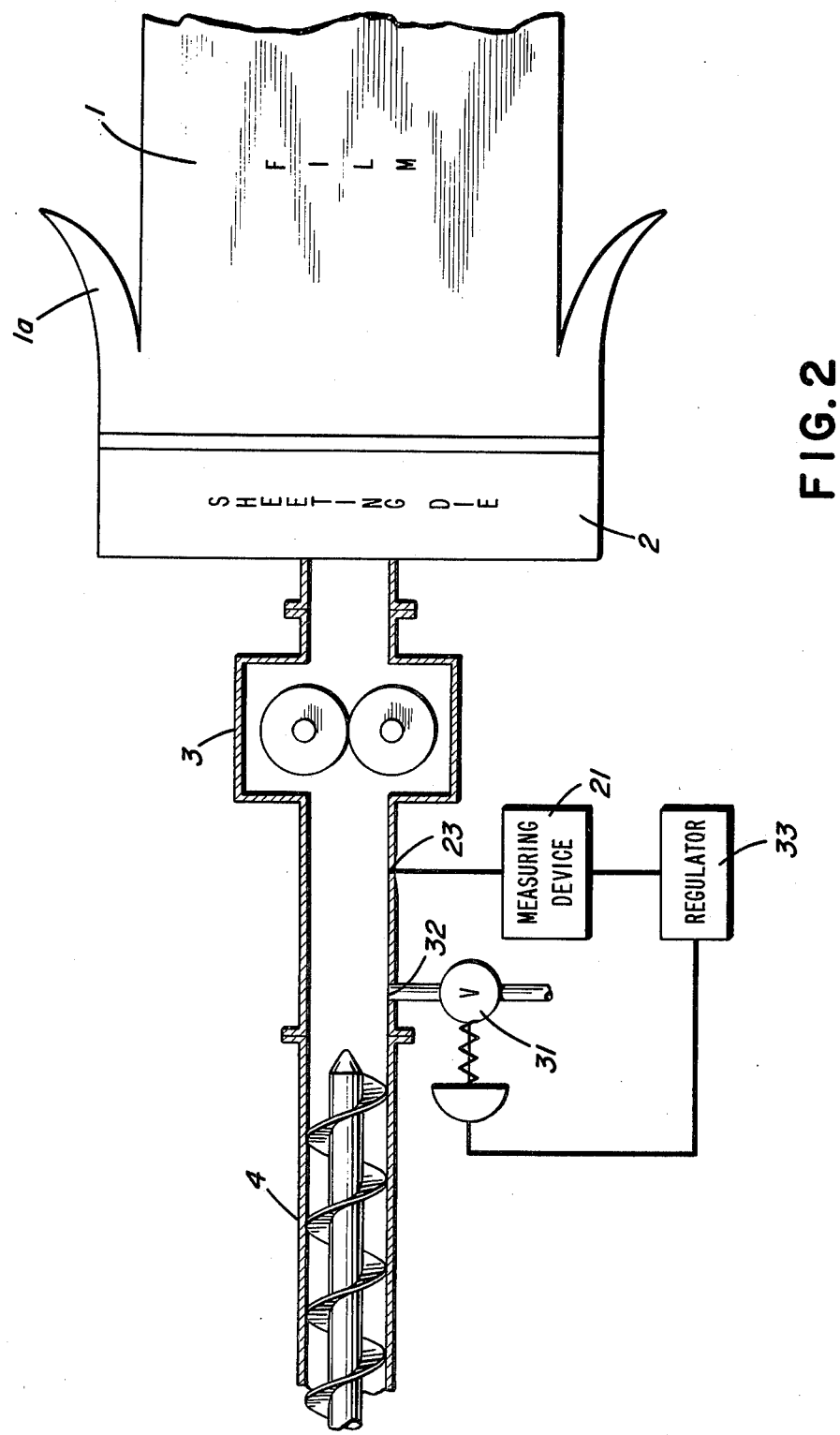
FIG. 2 shows another embodiment of the filling degree control of the worm or spiral press illustrated in FIG. 1.

In FIG. 2 another embodiment is shown for maintaining constant the filling degree in connection with the supply of material controlled by the dosing devices and connected with each other into the worm press 4. Here the total quantity of raw material and returning material added into the worm press 4 is principally kept somewhat higher than the discharge of the melting pump. The differential quantity of the added total quantity and the discharge is ejected from the outlet opening 32 between the worm press 4 and melting pump 3. Furthermore the mass pressure is measured by means of the measuring cooler 23 in the vicinity of the outlet opening 32, and the outlet opening 32 itself is provided with a regulating valve 31. The measured mass pressure is added via the measuring device 21 to the regulator 33 which changes the regulating valve 31 as a regulating unit and thus maintains the filling degree constant.

Hereinbelow we show an example for the controlled throughput quantities for the production of a polyvinyl-butyral film according to the flow diagram illustrated in FIG. 1. When applying the control of and maintaining constant the throughput quantities according to the present invention to the extrusion worm press, the following variations in thickness in the longitudinal direction have been noticed.

EXAMPLE

| | |
|---|---|
| Throughput quantity total | 200 kg/h |
| Throughput quantity of raw material in the proportion of solid matter to plasticizer = 74:26 | 80 kg/h |
| Throughput quantity of returning material at which | 120 kg/h |
| 88 kg/h is waste product and | |
| 32 kg/h is marginal strips | |
| Variations in thickness in the longitudinal direction | 12 μm |

At a certain point in time the supply of waste products will be terminated, so that then by means of the completely automatic control system the following quantities are obtained:

| | |
|---|---|
| Raw material in the proportion of solid matter to plasticizer = 74:26 | 168 kg/h |
| Marginal strips | 32 kg/h |
| Variations in thickness | 11 μm |

While we have shown and described several embodiments in accordance with the present invention, it is to be clearly understood that the same is susceptible of numerous changes and modifications as will be apparent to one skilled in this art. We, therefore, do not wish to be limited to the details shown and described herein but intend to cover all such changes and modifications as are encompassed by the scope of the appended claims.

We claim:

1. A process for extruding a film from materials including virgin polymer and returned scrap, said film having small variations in thickness, comprising:
   feeding virgin polymer to an extruder screw inlet and measuring the feed rate thereof;
   moving said virgin polymer and returned scrap through an extruder screw press and then moving said materials at a constant rate from the screw press and through a pump having a constant volume output per unit of time;
   then extruding said materials through a sheeting die, forming film;
   severing margins of said film and recycling the severed margins as scrap to said screw inlet;
   measuring the weight per unit time of recycled material returned to said screw inlet;
   subtracting the measured quantity of said severed margins from a nominal feed rate for said extruder and controlling the rate at which virgin polymer is fed according to differences between the amount of scrap returned and the nominal feed rate; and
   maintaining the pressure constant at an inlet to said constant volume pump.

2. A process according to claim 1, including weighing the amounts of said virgin polymer and scrap fed per unit of time.

3. A process according to claim 1, further including the step of delaying a measuring signal produced by measuring the severed material so as to synchronize the discharge of the returned material with the measured materials.

4. A process according to claim 3, wherein measuring of the raw materials is effected by feeders, a volume regulator within which the nominal value is set being operatively associated with the feeders, and an idle-time means operatively associated with the volume regulator for delaying the measured signal corresponding to the severed material.

5. A process according to claim 1, including controlling by an automatic controller the speed of a feeder for said virgin polymer and a feeder for plasticizer, and biasing the controller according to a function of pressure at an outlet of the extruder screw.

6. A process according to claim 5, wherein the returned materials comprise marginal strips and waste from the extruded film.

7. A process according to claim 6, wherein the materials comprise polyvinyl butyral and plasticizer.

8. A process according to claim 1, wherein the filling degree of the screw press is measured as a function of the pressure between the screw press and the constant volume pump, and further including the step of varying the nominal value within a small range to maintain the pressure constant.

9. A process according to claim 8, wherein the range is ±10 percent.

10. A process according to claim 8, wherein the varying of the nominal value is effected by means of a controller receiving the value of measured pressure at the screw outlet.

11. A process according to claim 1, wherein the total quantity of raw materials and returned materials supplied to the screw press is somewhat greater than the quantity discharged from the constant volume pump, and further including the step of ejecting the differential quantity between the total quantity and the discharged quantity from an outlet opening so as to maintain the filling degree of the screw press constant.

12. A process according to claim 11, wherein the outlet opening is located between the screw press and the constant volume pump.

13. A process according to claim 11, further including the step of measuring the pressure in the vicinity of the outlet opening.

14. A process according to claim 13, wherein the outlet opening is provided with a regulating valve for maintaining the pressure constant and the pressure is measured by means of a pressure sensing element.

* * * * *